US009777952B2

(12) United States Patent
Eriksen et al.

(10) Patent No.: US 9,777,952 B2
(45) Date of Patent: Oct. 3, 2017

(54) ACTIVE MAGNETIC REGENERATOR DEVICE

(71) Applicant: Danmarks Tekniske Universitet, Kgs. Lyngby (DK)

(72) Inventors: Dan Eriksen, Helsinge (DK); Kurt Engelbrecht, Copenhagen S (DK); Christian Bahl, Taastrup (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days.

(21) Appl. No.: 15/116,949

(22) PCT Filed: Feb. 4, 2015

(86) PCT No.: PCT/EP2015/052294
§ 371 (c)(1),
(2) Date: Aug. 5, 2016

(87) PCT Pub. No.: WO2015/118007
PCT Pub. Date: Aug. 13, 2015

(65) Prior Publication Data
US 2016/0348949 A1    Dec. 1, 2016

(30) Foreign Application Priority Data
Feb. 5, 2014    (EP) .................... 14154015

(51) Int. Cl.
*F25B 21/00*   (2006.01)
*F25B 41/04*   (2006.01)

(52) U.S. Cl.
CPC .............. *F25B 21/00* (2013.01); *F25B 41/04* (2013.01); *F25B 2321/0022* (2013.01); *F25B 2600/2515* (2013.01); *Y02B 30/66* (2013.01)

(58) Field of Classification Search
CPC ... F25B 21/00; F25B 2321/0021; Y02B 30/66
(Continued)

(56) References Cited

U.S. PATENT DOCUMENTS 3,841,107 A * 10/1974 Clark ...................... F25B 21/00
                                                                165/96
4,332,135 A *  6/1982 Barclay .................. F25B 21/00
                                                                505/889
(Continued)

FOREIGN PATENT DOCUMENTS

EP        0187078 B1    5/1989
EP        2669604 A1   12/2013
(Continued)

OTHER PUBLICATIONS

Okamura, T., et al., "Performance of a Room-Temperature Rotary Magnetic Refrigerator", Proceedings of the 1st International Conference of Refrigeration at Room Temperature, Sep. 2005, pp. 1-6.
(Continued)

*Primary Examiner* — Melvin Jones
(74) *Attorney, Agent, or Firm* — Wood Herron & Evans LLP

(57) ABSTRACT

A rotating active magnetic regenerator (AMR) device comprising two or more regenerator beds, a magnet arrangement and a valve arrangement. The valve arrangement comprises a plurality of valve elements arranged substantially immovably with respect to the regenerator beds along a rotational direction. A cam surface is arranged substantially immovably with respect to the magnet arrangement along the rotational direction, and comprises a plurality of cam elements arranged to cooperate with the valve elements in order to control opening degrees of the valve elements, in accordance with a relative position of the cam elements and the valve elements. Thereby the opening degree of each valve element is controlled in accordance with a relative angular position of the regenerator beds and the magnet arrangement.

13 Claims, 4 Drawing Sheets

(58) Field of Classification Search
USPC .......................................................... 62/3.1
See application file for complete search history.

(56) References Cited

U.S. PATENT DOCUMENTS

| | | | |
|---|---|---|---|
| 6,526,759 B2 | 3/2003 | Zimm et al. | |
| 6,935,121 B2* | 8/2005 | Fang | F25B 21/00 62/3.1 |
| 8,037,692 B2 | 10/2011 | Muller et al. | |
| 2003/0106323 A1 | 6/2003 | Zimm et al. | |
| 2006/0218936 A1* | 10/2006 | Kobayashi | F25B 21/00 62/3.1 |
| 2007/0130960 A1* | 6/2007 | Muller | F25B 21/00 62/3.1 |

FOREIGN PATENT DOCUMENTS

| WO | 03050456 A1 | 6/2003 |
|---|---|---|
| WO | 2009024412 A1 | 2/2009 |

OTHER PUBLICATIONS

Zimm, C., et al., "Design and Initial Performance of a Magnetic Refrigerator with a Rotating Permanent Magnet", Proceedings of the 2nd International Conference on Magnetic Refrigeration at Room Temperature, Apr. 2007, pp. 341-346.

Engelbrecht, K. et al., "Experimental Results for Novel Rotary Active Magnetic Regenerator", International Journal of Refrigeration, vol. 35, Issue 6, Sep. 2012, pp. 1498-1505.

Arnold, D., et al., "Design Improvements of a Permanent Magnet Active Magnetic Regenerator", Proceedings of the 5th International Conference on Magnetic Refrigeration at Room Temperature, Sep. 2012, pp. 309-315.

International Searching Authority, Search Report and Written Opinion Issued in Corresponding International Application No. PCT/EP2015/052294, dated May 12, 2015.

* cited by examiner

ACTIVE MAGNETIC REGENERATOR DEVICE

FIELD OF THE INVENTION

The present invention relates to an active magnetic regenerator device of the kind comprising two or more regenerator beds and a magnet arrangement arranged at least partly circumferentially with respect to the regenerator beds. In the active magnetic regenerator device of the invention, a flow profile of fluid flowing through the regenerator beds can be controlled to closely follow variations in the magnetic field across the magnet arrangement.

BACKGROUND OF THE INVENTION

Magnetic refrigeration and heating relies on the magnetisation and demagnetisation of magnetocaloric materials and the subsequent removal of the generated heat by a fluid flow. Active magnetic regenerator devices normally comprise a number of regenerator beds, each comprising magnetocaloric material. The regenerator beds are sequentially passed through a magnetic field generated by a magnet arrangement, e.g. comprising one or more permanent magnets. Thereby the magnetocaloric material of the regenerator beds is alternatingly magnetised and demagnetised, and heat is generated. A fluid flow is passed through each regenerator bed in order to remove the generated heat from the regenerator beds. The heat is subsequently removed from the device by means of a heat exchanger, through which the fluid passes.

The performance of such an active magnetic regenerator device is partly determined by the flow rate of the fluid passing through the regenerator beds, and also the exact timing of the fluid flow. Previous attempts to control the flow rate have relied on designing valves, which control the supply of fluid to the regenerator beds.

WO 03/050456 A1 discloses a rotating active magnetic regenerator comprising a valve system which ensures reciprocating fluid flow through the regenerator beds, in synchronization with the rotating movements of the magnet. This is obtained by means of individually rotating valves connected to the mechanism which moves the magnet.

EP 0 187 078 B1 discloses a rotating active magnetic regenerator comprising a valve system which ensures reciprocating fluid flow through the regenerator beds, in synchronization with the rotating movements of the magnet. The valve system comprises discs provided with orifices, the discs being arranged to rotate along with the magnet.

U.S. Pat. No. 8,037,692 B2 discloses a rotating active magnetic regenerator comprising a valve system which ensures reciprocating fluid flow through the regenerator beds. Synchronization between the rotating movements of the magnet and the fluid flow is obtained by carefully controlling one or more solenoid valves.

Common to the prior art documents described above is, that none of the active magnetic regenerator devices described therein provide an easy manner of ensuring that the flow profile matches variations in the magnetic field.

DESCRIPTION OF THE INVENTION

It is an object of embodiments of the invention to provide an active magnetic regenerator which has an improved performance as compared to prior art active magnetic regenerators.

It is a further object of embodiments of the invention to provide an active magnetic regenerator in which the risk of leaking is minimised.

It is an even further object of embodiments of the invention to provide an active magnetic regenerator comprising a valve arrangement, in which valve friction is low.

It is an even further object of embodiments of the invention to provide an active magnetic regenerator in which flow control is fast acting.

The invention provides an active magnetic regenerator device comprising:

- two or more regenerator beds, each regenerator bed comprising magnetocaloric material, a first flow passage allowing fluid to pass through the regenerator bed along a first flow direction, and a second flow passage allowing fluid to pass through the regenerator bed along a second flow direction, the second flow direction being substantially opposite to the first flow direction,
- a magnet arrangement arranged at least partly circumferentially with respect to the regenerator beds, the magnet arrangement comprising at least two sections comprising permanent magnets,
- a first heat exchanger arranged to exchange heat with fluid received from the first flow passages of the regenerator beds, and a second heat exchanger arranged to exchange heat with fluid received from the second flow passages of the regenerator beds, and
- a valve arrangement arranged to control fluid flow through the regenerator beds, wherein the regenerator beds and the magnet arrangement are arranged to perform rotational movements relative to each other, and wherein the valve arrangement comprises:

- a plurality of valve elements, each valve element being arranged to control a supply of fluid to at least one regenerator bed, via the first flow passage or the second flow passage, the plurality of valve elements being arranged substantially immovably with respect to the regenerator beds along a direction of relative rotational movement, and
- at least one cam surface arranged substantially immovably with respect to the magnet arrangement along the direction of relative rotational movement, the cam surface(s) comprising a plurality of cam elements arranged along the cam surface, each cam element being adapted to cooperate with a valve element in order to control an opening degree of the valve element, in accordance with a relative position of the cam element and the valve element,
- the valve elements and the cam surface thereby being arranged to perform rotational movements relative to each other, said movements corresponding to the relative movements of the regenerator beds and the magnet arrangement, the opening degree of each valve element thereby being controlled in accordance with a relative angular position of the regenerator beds and the magnet arrangement.

The active magnetic regenerator device of the invention comprises two or more regenerator beds, a magnet arrangement, a first heat exchanger, a second heat exchanger and a valve arrangement arranged to control fluid flow through the regenerator beds.

Each of the regenerator beds comprises magnetocaloric material. The magnetocaloric material is capable of generating heat, thereby providing heating or cooling, when the magnetocaloric material is alternatingly magnetised and demagnetised. The regenerator beds may comprise a single magnetocaloric material. As an alternative, two or more different magnetocaloric materials may be applied.

Each regenerator bed further comprises a first flow passage allowing fluid to pass through the regenerator bed along a first flow direction, and a second flow passage allowing fluid to pass through the regenerator bed along a second flow direction. The first flow direction is substantially opposite to the second flow direction. Accordingly, fluid is allowed to pass through the regenerator beds, and thereby along the magnetocaloric material. One of the fluid flows is used for removing heat generated by the magnetocaloric material in response to the magnetocaloric material being magnetised, while the other one of the fluid flows is used for supplying heat to the magnetocaloric material when the magnetocaloric material is demagnetised. This may be regarded as removing cooling from the regenerator beds.

The magnet arrangement comprises at least two sections comprising permanent magnets. The permanent magnet sections may be arranged spaced apart, e.g. with sections of another material arranged there between. This will be described further below. As an alternative, the permanent magnet sections may be arranged immediately adjacent to each other. The permanent magnet sections may be designed to provide magnetic fields which vary from one section to the other. For instance the direction of the magnetic field generated by the permanent magnet of one section may differ from the direction of the magnetic field generated by the permanent magnet of a neighbouring section.

The magnet arrangement is arranged at least partly circumferentially with respect to the regenerator beds. This should be interpreted to mean that the regenerator beds and the magnet arrangement are arranged adjacent to each other, in such a manner that either the magnet arrangement, completely or partly, surrounds the regenerator beds, or the regenerator beds, completely or partly, surround the magnet arrangement. Thus, the magnet arrangement may be arranged on the inside and/or on the outside with respect to the regenerator beds. Furthermore, the magnet arrangement may be arranged along the entire circumference (inside or outside) of the regenerator beds, or it may be arranged along only a part of the circumference of the regenerator beds. For instance, the magnet arrangement may have a 'C' shape, leaving a part of the circumference of the regenerator beds, which is not 'covered' by the magnet arrangement.

Soft magnetic material may be arranged according to the magnet arrangement in such a manner that it acts to ensures magnetic flux closure of the magnetic circuit. Thus, in the case where the magnet arrangement, completely or partly, surrounds the regenerator beds the soft magnetic material may be arranged inside the regenerator beds. Alternatively, in the case where the regenerator beds, completely or partially, surrounds the magnet arrangement the soft magnetic material may be arranged at least partly circumferentially with respect to the regenerator beds.

The first heat exchanger is arranged to exchange heat with fluid received from the first flow passages of the regenerator beds, and the second heat exchanger is arranged to exchange heat with fluid received from the second flow passages of the regenerator beds. As described above, one of the fluid flows removes heat from the regenerator beds, while the other fluid flow supplies heat to, or removes cooling from, the regenerator beds. Thus, the heat exchanger which is arranged to exchange heat with the fluid flows which remove heat from the regenerator beds, is a heat rejecting heat exchanger, in the sense that it ensures that the heat removed from the regenerator beds is transferred out of the system. Similarly, the heat exchanger which is arranged to exchange heat with the fluid flows which remove cooling from the regenerator beds, is a heat consuming heat exchanger, in the sense that it ensures that the cooling effect removed from the regenerator beds is transferred out of the system.

When the fluid has passed through one of the heat exchangers it may advantageously be led back through the regenerator beds, via the other flow passage. Thus, the fluid flow through the system may be as follows: First flow passage of a regenerator bed; first heat exchanger; second flow passage through a regenerator bed; second heat exchanger; etc.

The valve arrangement is arranged to control the fluid flow through the regenerator beds. This is necessary, because, for a given regenerator bed, whether fluid is allowed to pass through the first or the second flow passage, must be synchronized with the magnetisation and demagnetisation of the magnetocaloric material of the regenerator bed.

The regenerator beds and the magnet arrangement are arranged to perform rotational movements relative to each other. This could be obtained by allowing the regenerator beds to be stationary, while allowing the magnet arrangement to rotate; by allowing the magnet arrangement to be stationary, while allowing the regenerator beds to rotate; or by allowing the magnet arrangement as well as the regenerator beds to rotate, e.g. in opposite directions and/or at different rotational speeds. Accordingly, the active magnetic regenerator device of the invention is of a rotational type.

When the regenerator beds and the magnet arrangement rotate relative to each other, and due to the circumferential relative position of the regenerator beds and the magnet arrangement, each of the regenerator beds will sequentially be arranged in the magnetic field generated by each of the permanent magnets of the permanent magnet sections. This causes the magnetocaloric material of the regenerator beds to be sequentially magnetised and demagnetised.

The valve arrangement comprises a plurality of valve elements and at least one cam surface. Each of the valve elements is arranged to control a supply of fluid to a regenerator bed, via the first flow passage or the second flow passage. Thus, each of the flow passages through the regenerator beds is provided with a valve element which controls the supply of fluid to that passage. Accordingly, for a given regenerator bed and at a given time, the corresponding valve elements determine whether fluid is passing through the first flow passage or the second flow passage, as well as the flow rate of the fluid passing through the first or second flow passage.

The valve elements are arranged substantially immovably with respect to the regenerator beds along a direction of relative rotational movement. Thus, when the regenerator beds and the magnet arrangement perform relative rotational movements, the valve elements, as a general rule, move along with the regenerator beds or remain stationary along with the regenerator beds, i.e. the relative position of the valve elements and the regenerator beds remains substantially fixed. This is an advantage, because thereby it is not necessary to provide sealing between inlets to the flow passages of the regenerator beds and valve elements which are moving with respect to the inlets. Thereby the risk of leaking from the active magnetic regenerator device is minimised. However, it is not ruled out that it is possible to perform small adjustments of the position of the valve elements relative to the regenerator beds, along the direction of relative rotational movement. This could, e.g., be used for adjusting the timing of the operation of the valves. This could, e.g., be relevant in order to take fluid inertial effects into account during high frequency operation. Furthermore, the valve elements may not be fixed relative to the regenerator beds along an axial direction defined by an axis of rotation of the relative rotational movement.

The cam surface(s) comprise(s) a plurality of cam elements arranged along the cam surface. Each cam element is adapted to cooperate with a valve element in order to control an opening degree of the valve element, in accordance with a relative position of the cam element and the valve element. Thus, the opening degree of each of the valve elements can be adjusted by adjusting the relative position between the cam surface, and thereby each of the cam elements, relative to the valve elements.

The cam surface is arranged substantially immovably with respect to the magnet arrangement along the direction of relative rotational movement. Thus, when the regenerator beds and the magnet arrangement perform relative rotational movements, the cam surface, and thereby the cam elements, as a general rule, move along with the magnet arrangement or remain stationary along with the magnet arrangement, i.e. the relative position of the cam surface and the magnet arrangement remains substantially fixed. However, it is not ruled out that it is possible to perform small adjustments of the position of the cam surface relative to the magnet arrangement, along the direction of relative rotational movement. This could, e.g., be used for adjusting the timing of the operation of the valves. This could, e.g., be relevant in order to take fluid inertial effects into account during high frequency operation. Furthermore, the cam surface may not be fixed relative to the magnet arrangement along an axial direction defined by an axis of rotation of the relative rotational movement.

Accordingly, when the regenerator beds and the magnet arrangement perform rotational movements relative to each other, the valve elements and the cam surface perform corresponding rotational movements relative to each other. Since the opening degree of each of the valve elements is determined by the relative position of the valve element and the corresponding cam element, the opening degree of each of the valve elements is determined by the relative position of the regenerator beds and the magnet arrangement. As a consequence, the opening degree of each of the valve elements, and thereby the flow rate of fluid supplied to the flow passages of the regenerator beds, is automatically synchronized with the relative position of the magnet arrangement and the regenerator beds, and thereby with the sequential magnetisation and demagnetisation of the magnetocaloric material of the regenerator beds. Furthermore, the cam elements can be designed in a manner which closely matches the magnetic field profile provided by the permanent magnets. This improves the performance of the active magnetic regenerator device.

Providing a fluid supply to the flow passages of the regenerator beds by means of interacting valve elements and cam elements is, furthermore, a very simple design, which reduces the risk of faults occurring during operation.

The regenerator beds may be stationary and the magnet arrangement may be adapted to perform rotational movements. According to this embodiment, the regenerator beds and the valve elements do not perform rotational movements. This is an advantage, because thereby the fluid supply to the valve arrangement can also be kept stationary, thereby further reducing the risk of leaks. However, as described above, it could also be envisaged that the regenerator beds could perform rotational movements.

Each cam element may have a shape which reflects variations in a magnetic field generated by a permanent magnet section of the magnet arrangement, the valve elements thereby defining a fluid flow profile which is chosen according to a magnetic field profile of the permanent magnet. According to this embodiment, the cam surfaces are carefully designed to provide a desired fluid flow profile which closely follows the variations in the magnetic field as the regenerator bed passes through the magnetic field generated by a permanent magnet of the magnet arrangement. For instance, the cam element may have a profile which causes the opening degree of the valve element to increase gradually in a manner which follows an increase in the magnetic field as the regenerator bed is moved into alignment with a permanent magnet section.

The cam surface may comprise at least a first region and a second region, and the first region may comprise a plurality of cam elements having a first shape, and the second region may comprise a plurality of cam elements having a second shape, the second shape differing from the first shape, and the cam surface may be movable between a first position in which the first region is arranged in contact with the valve elements and a second position in which the second region is arranged in contact with the valve elements. According to this embodiment, the cam surface defines at least two different flow profile patterns, one corresponding to the cam elements of the first region and one corresponding to the cam elements of the second region. It is possible to choose between the flow profile patterns, simply by moving the cam surface between the first position and the second position. For instance, one of the flow profile patterns may be designed to provide a "high cooling power" flow mode, while another flow profile pattern may be designed to provide a "high efficiency" flow mode. As an alternative, one of the flow profile patterns may be designed to meet requirements during start-up of the active magnetic regenerator device, while another flow profile pattern may be designed to meet requirements during normal operation of the active magnetic regenerator device.

The cam surface may further comprise an intermediate region arranged between the first region and the second region, said intermediate region defining substantially continuous cam sections interconnecting the cam elements of the first region with cam elements of the second region. According to this embodiment, the active magnetic regenerator device may be operated in two modes, i.e. the mode defined by the cam elements of the first region and the mode defined by the cam elements of the second region. However, due to the intermediate region, the cam surface can be moved between first position and the second position, thereby switching between the two modes, without having to stop operation of the active magnetic regenerator device.

As an alternative, each of the cam elements may have a shape which varies substantially continuously along a substantially axial direction. According to this embodiment, the part of the cam elements, which is arranged in contact with the valve elements, can be continuously changed by moving the cam surface along the substantially axial direction. Since the shape of the cam elements varies continuously, this causes a continuous change in the flow profile of the fluid flow provided by the valve elements. Thus, according to this embodiment, the flow profile can be continuously adjusted to meet the exact requirements under the given circumstances, simply by selecting an appropriate axial position of the cam surface.

The valve elements may be poppet valves. Poppet valves are very suitable for this purpose, because they can easily be controlled by means of a cam surface. As an alternative, other suitable kinds of valves could be used.

The cam surface may form an inner surface or an outer surface of a ring shaped member. According to this embodiment, the active magnetic regenerator device may advantageously have a cylindrically symmetrical shape, where the regenerator beds and/or the magnet arrangement is/are arranged to rotate about the axis defined by the cylindrical shape, and with the regenerator beds and the magnet arrangement arranged adjacent to each other along the radial direction defined by the cylindrical shape. In the case that the regenerator beds are arranged closer to the axis than the magnet arrangement, then the cam surface may advantageously form an inner surface of a ring shaped member, since such an inner surface will, in this case, face the regenerator beds, and thereby the valve elements. On the other hand, in the case that the magnet arrangement is arranged closer to the axis than the regenerator beds, then the cam surface may advantageously form an outer surface of a ring shaped member.

The magnet arrangement may further comprise at least two sections of soft magnetic material, arranged between the permanent magnet sections. According to this embodiment, the regenerator beds will alternatingly be moved past a permanent magnet section, thereby magnetising the magnetocaloric material, and a soft magnetic material section, thereby demagnetising the magnetocaloric material. Furthermore, the permanent magnet sections are spaced apart by the sections comprising soft magnetic material.

The regenerator beds may be arranged annularly. The regenerator beds may further be arranged angularly equidistantly.

Similarly, the permanent magnet sections may be arranged annularly. The permanent magnet sections may further be arranged angularly equidistantly.

The active magnetic regenerator device of the invention is equally suitable for being used as a cooling system, in the form of a refrigeration system or the like, or as a heating system, in the form of a heat pump, such as a ground source heat pump.

BRIEF DESCRIPTION OF THE DRAWINGS

The invention will now be described in further detail with reference to the accompanying drawings in which.

DETAILED DESCRIPTION OF THE DRAWINGS

Figure 1:
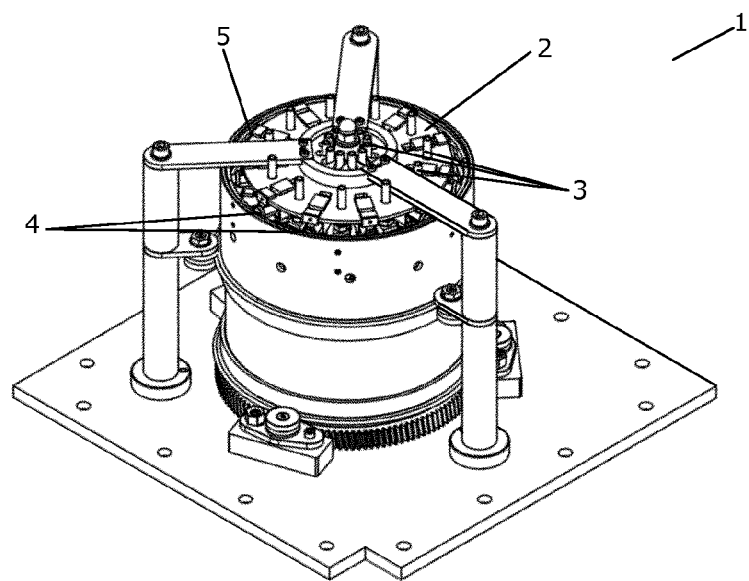
FIG. 1 is an isometric view of an active magnetic regenerator device according to an embodiment of the invention.

FIG. 1 is an isometric view of an active magnetic regenerator device 1 according to an embodiment of the invention. The active magnetic regenerator device 1 comprises a stationary part comprising a number of regenerator beds (not visible) and a valve arrangement 2. The valve arrangement 2 is fluidly connected to the regenerator beds in such a manner that it supplies fluid to flow passages defined in the regenerator beds. The valve arrangement 2 is, thus, connected to an external flow circuit (not shown) via fluid connections 3.

The valve arrangement 2 further comprises a number of poppet valves 4, each being connected to a flow passage of a regenerator bed. A given poppet valve 4 thereby defines the fluid flow supplied to the corresponding flow passage. This will be described in further detail below.

The active magnetic regenerator device 1 further comprises a rotating part comprising a magnet arrangement (not shown) and a cam ring 5 defining a cam surface formed on an inner surface of the cam ring 5. The magnet arrangement and the cam ring 5 rotate together relatively to the regenerator beds and the valve arrangement 2 during operation of the active magnetic regenerator device 1. The cam surface formed on the cam ring 5 comprises a number of cam elements (not shown). The cam elements are arranged in contact with the poppet valves 4 of the valve arrangement in such a manner that the relative angular position of the cam ring 5 and the poppet valves 4 defines an opening degree of each of the poppet valves 4. Thereby the relative angular position of the cam ring 5, and thereby the magnet arrangement, and the poppet valves 4, and thereby the regenerator beds, determines the opening degree of each of the poppet valves 4.

Figure 2:
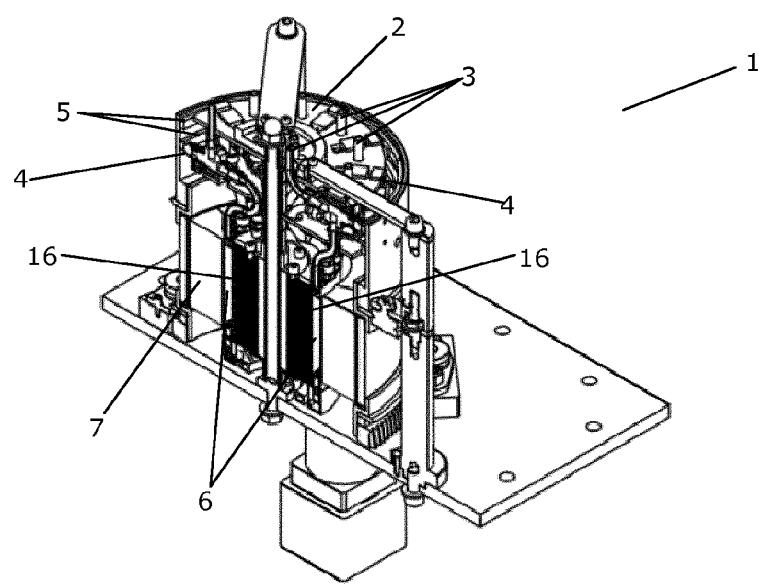
FIG. 2 is a cross sectional view of the active magnetic regenerator device of FIG. 1.

FIG. 2 is a cross sectional view of the active magnetic regenerator device 1 of FIG. 1. In FIG. 2 the regenerator beds 6 and the magnet arrangement 7 can be seen.

Each of the regenerator beds 6 comprises magnetocaloric material, and a first flow passage and a second flow passage. Furthermore, soft magnetic material 16 is arranged in each regenerator bed 6, in such a manner that the magnetocaloric material is arranged circumferentially with respect to the soft magnetic material in each regenerator bed 6. The soft magnetic material 16 ensures magnetic flux closure of the magnetic circuit comprising the magnets and the soft magnetic material of the magnet arrangement 7 and the magnetocaloric material in the regenerator beds 6.

One of the flow passages extends from the valve arrangement 2 towards an opposite end of the regenerator bed 6. The other of the flow passages extends from the opposite end of the regenerator bed 6 towards the valve arrangement 2.

The magnet arrangement 7 comprises a number of sections comprising permanent magnets, spaced apart by means of sections of soft magnetic material. Thus, when the magnet arrangement 7 is rotated relative to the regenerator beds 6, each regenerator bed 6 is alternatingly arranged adjacent to a permanent magnet section and a soft magnetic material section of the magnet arrangement. Thereby the magnetocaloric material of the regenerator beds 6 is alternatingly magnetised and demagnetised. Furthermore, when some of the regenerator beds 6 are arranged adjacent to a permanent magnet section, other regenerator beds 6 will be arranged adjacent to a soft magnetic material section of the magnet arrangement.

When the magnetocaloric material is magnetised, it generates heat, and when it is demagnetised, it absorbs heat. Thus, when a regenerator bed 6 is arranged adjacent to a permanent magnet section, a fluid flow must be provided through the flow passages of the regenerator bed, which removes the generated heat. Similarly, when the regenerator bed 6 is arranged adjacent to a soft magnetic material section of the magnet arrangement, a fluid flow must be provided through the flow passages of the regenerator bed 6, which supplies heat to, or removes cooling from, the regenerator bed 6. Therefore it is important that the supply of fluid to the first and second flow passages of each regenerator bed 6 is synchronized with the movements of the magnet arrangement 7, relative to the regenerator beds 6, in order to provide an efficient active magnetic regenerator device 1. Accordingly, the heat transfer between the regenerator beds 6 and the fluid is driven by the change in temperature of the magnetocaloric material of the regenerator beds 6, due to the alternating magnetisation and demagnetisation of the magnetocaloric material.

Since the cam ring 5 rotates along with the magnet arrangement 7, the cam elements of the cam surface are moved relative to the poppet valves 4 in the same manner. Furthermore, since the cam elements and the poppet valves 4 cooperate in controlling the opening degrees of the poppet valves 4, according to their relative position, the opening degree of each poppet valve 4 is automatically controlled in a manner which is synchronized with the magnetisation and demagnetisation of the magnetocaloric material of the regenerator beds 6. Thereby it is also automatically ensured that the fluid flow to the first and second flow passages of each regenerator bed 6 is synchronized with the magnetisation and demagnetisation of the magnetocaloric material.

Furthermore, since the poppet valves 4 are stationary, i.e. they are immovable with respect to the regenerator beds 6, and thereby with respect to flow passages of the regenerator beds 6, the valves do not comprise parts which are moving relative to each other, and which therefore need sealing there between. This minimises the risk of leaking.

Figure 3:
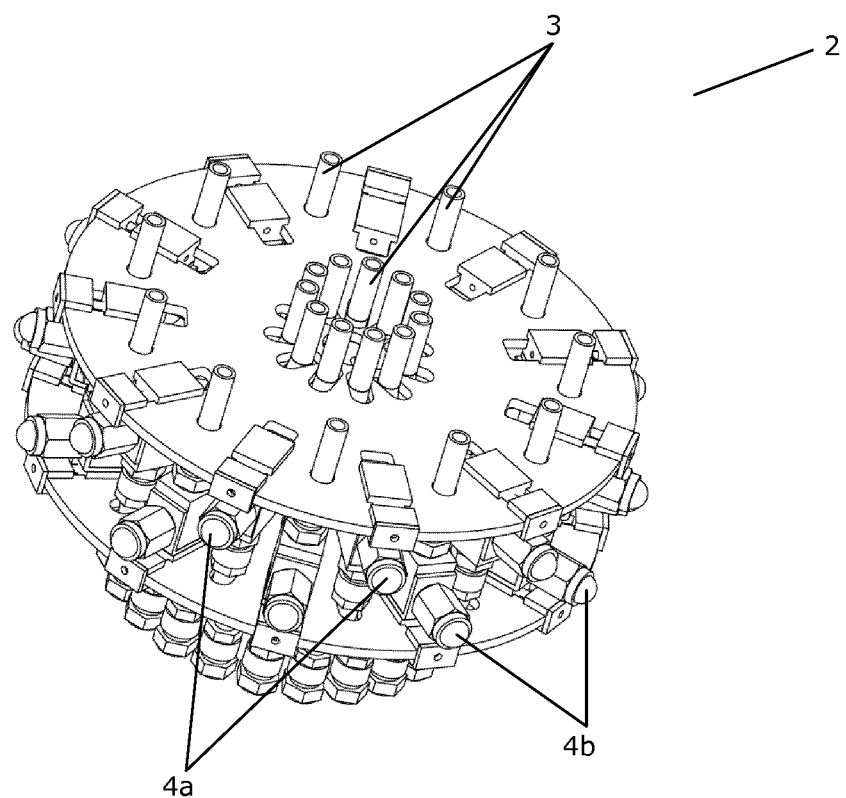
FIG. 3 is an isometric view of a valve arrangement for the active magnetic regenerator device of FIGS. 1 and 2.

FIG. 3 is an isometric view of a valve arrangement 2 for the active magnetic regenerator device 1 of FIGS. 1 and 2. A cam ring 5 can be arranged adjacent to the valve arrangement 2. The cam ring 5 may be divided into two parts, one arranged in abutment with a first subset of the poppet valves 4a, and the other arranged in abutment with another subset of the poppet valves 4b. The first subset of poppet valves 4a control fluid supply to the first flow passages of the regenerator beds, and the second subset of poppet valves 4b control fluid supply to the second flow passages of the regenerator beds.

It is easy to imagine how cam surfaces formed on the inner side of the cam ring can be arranged in abutment with the poppet valves 4, in such a manner that cam elements formed on the cam surfaces determine how much the poppet valves 4 are depressed, and thereby the opening degrees of the poppet valves 4.

Figure 4:
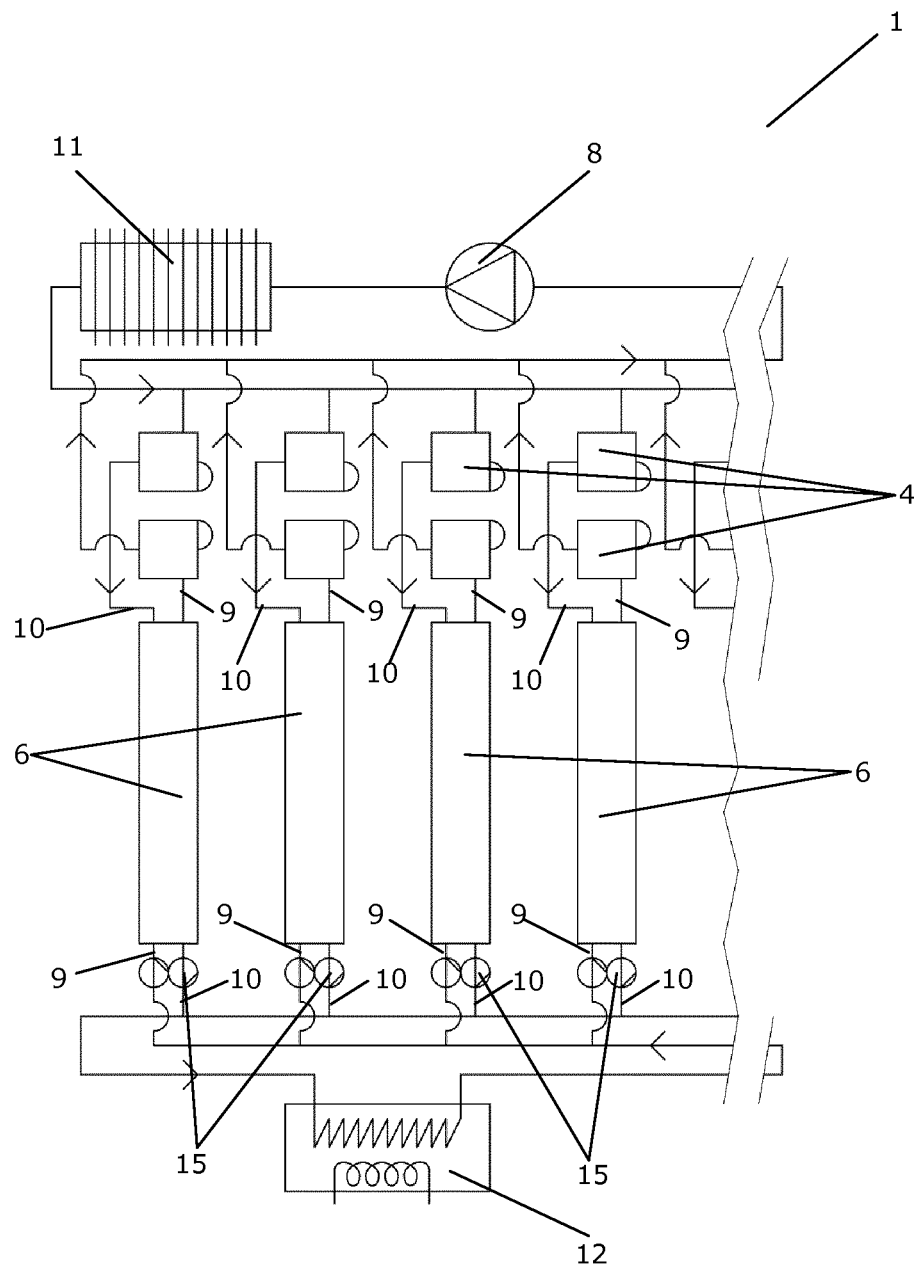
FIG. 4 is a diagrammatic view of an active magnetic regenerator device according to an embodiment of the invention, illustrating the flow of fluid through the regenerator beds.

FIG. 4 is a diagrammatic view of an active magnetic regenerator device 1 according to an embodiment of the invention, illustrating the flow of fluid through the regenerator beds 6. Four regenerator beds 6 are shown. A pump 8 is arranged to drive the fluid flow through the active magnetic regenerator device 1. The active magnetic regenerator device 1 illustrated in FIG. 4 could, e.g., be the active magnetic regenerator device 1 shown in FIGS. 1 and 2.

Each of the regenerator beds 6 comprises a first flow passage 9 and a second flow passage 10. Fluid flowing through the first flow passages 9 is arranged to remove heat generated by the magnetocaloric material of the regenerator beds 6, and fluid flowing through the second flow passages 10 is arranged to supply heat to, i.e. to remove cooling from, the magnetocaloric material of the regenerator beds 6. The fluid flow through the active magnetic regenerator device 1 is as follows.

When a given regenerator bed 6 is moved into the magnetic field generated by one of the permanent magnets of the magnet arrangement, the cam surface simultaneously rotates to operate a poppet valve 4 which supplies fluid to the first flow passage 9 of that regenerator bed 6. As the regenerator bed 6 is moved into the magnetic field, the poppet valve 4 is opened in a manner which corresponds to the magnetic field experienced by the regenerator bed 6.

The fluid is then allowed to pass through the regenerator bed 4, via the first flow passage 9. Thereby heat generated by the magnetocaloric material, which has been magnetised by the magnetic field, is removed by the fluid, i.e. the fluid is heated. When the fluid leaves the first flow passage 9, it is passed, via the pump 8, through a first heat exchanger 11, where the fluid is cooled, thereby removing the heat from the system.

Simultaneously, some of the other regenerator beds 6 are arranged adjacent to a section of the magnet arrangement which comprises soft magnetic material, and the magnetocaloric material of these regenerator beds 6 is therefore demagnetised. The cam surface is in a position which opens the poppet valves 4 which supply fluid to the second flow passages 10 of these regenerator beds 6.

Therefore, the fluid leaving the first heat exchanger 11 is allowed to pass through these regenerator beds 6, via the second flow passages 10. Thereby heat is supplied to, or cooling is removed from, the magnetocaloric material of these regenerator beds 6. Finally, the fluid is passed through a second heat exchanger 12, before it is once again passed through first flow passages 9 of some of the regenerator beds 6. In the second heat exchanger 12 the fluid is heated. Check valves 15 are provided opposite to the poppet valves 4 in order to ensure unidirectional flow in the second heat exchanger 12.

The fluid flow through a given regenerator bed 6 is alternated between being passed through the first flow passage 9 and the second flow passage 10, in synchronization with the regenerator bed 6 being arranged adjacent to a permanent magnet section or adjacent to a section of the magnet arrangement comprising soft magnetic material, due to the cooperation between the poppet valves 4 and the cam elements of the cam surface, as described above.

Figure 5:
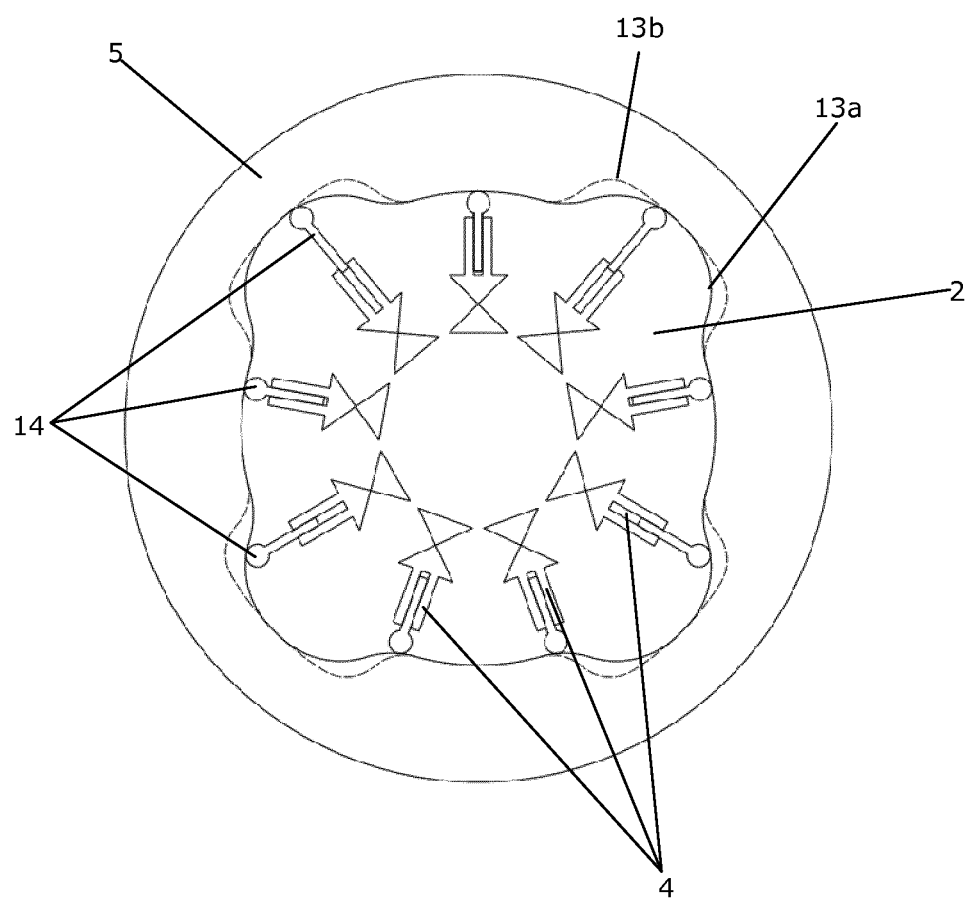
FIG. 5 illustrates a valve arrangement for an active magnetic regenerator device according to an embodiment of the invention.

FIG. 5 illustrates a valve arrangement 2 and a cam surface 13 for an active magnetic regenerator device according to an embodiment of the invention. A cam ring 5 is arranged adjacent to the valve arrangement 2. The inner surface of the cam ring 5 forms a cam surface 13 which is arranged in abutment with the poppet valves 4 of the valve arrangement 2.

The cam surface 13 defines two cam profiles 13a and 13b. A first cam profile 13a is shown as a solid line, and a second cam profile 13b is shown as a dashed line. The cam ring 5 can be moved along an axial direction in order to position the first cam profile 13a or the second cam profile 13b in abutment with the poppet valves 4. In FIG. 5 the first cam profile 13a is arranged in abutment with the poppet valves 4.

It is clear from FIG. 5 that the relative position of the cam ring 5 and a given poppet valve 4 determines the position of a follower 14 of the poppet valve 4, and thereby determines the opening degree of the poppet valve 4.

The invention claimed is:

1. An active magnetic regenerator device comprising:
two or more regenerator beds, each regenerator bed comprising magnetocaloric material, a first flow passage allowing fluid to pass through the regenerator bed along a first flow direction, and a second flow passage allowing fluid to pass through the regenerator bed along a second flow direction, the second flow direction being substantially opposite to the first flow direction,
a magnet arrangement arranged at least partly circumferentially with respect to the regenerator beds, the magnet arrangement comprising at least two sections comprising permanent magnets, a first heat exchanger arranged to exchange heat with fluid received from the first flow passages of the regenerator beds, and a second heat exchanger arranged to exchange heat with fluid received from the second flow passages of the regenerator beds, and a valve arrangement arranged to control fluid flow through the regenerator beds, wherein the regenerator beds and the magnet arrangement are arranged to perform rotational movements relative to each other, and wherein the valve arrangement comprises:

a plurality of valve elements, each valve element being arranged to control a supply of fluid to at least one regenerator bed, via the first flow passage or the second flow passage, the plurality of valve elements being arranged substantially immovably with respect to the regenerator beds along a direction of relative rotational movement, and at least one cam surface arranged substantially immovably with respect to the magnet arrangement along the direction of relative rotational movement, the cam surface(s) comprising a plurality of cam elements arranged along the cam surface, each cam element being adapted to cooperate with a valve element in order to control an opening degree of the valve element, in accordance with a relative position of the cam element and the valve element, the valve elements and the cam surface thereby being arranged to perform rotational movements relative to each other, said movements corresponding to the relative movements of the regenerator beds and the magnet arrangement, the opening degree of each valve element thereby being controlled in accordance with a relative angular position of the regenerator beds and the magnet arrangement.

2. The active magnetic regenerator device according to claim 1, wherein the regenerator beds are stationary and the magnet arrangement is adapted to perform rotational movements.

3. The active magnetic regenerator device according to claim 1, wherein each cam element has a shape which reflects variations in a magnetic field generated by a permanent magnet section of the magnet arrangement, the valve elements thereby defining a fluid flow profile which is chosen according to a magnetic field profile of the permanent magnet.

4. The active magnetic regenerator device according to claim 1, wherein the cam surface comprises at least a first region and a second region, and wherein the first region comprises a plurality of cam elements having a first shape, and the second region comprises a plurality of cam elements having a second shape, the second shape differing from the first shape, and wherein the cam surface is movable between a first position in which the first region is arranged in contact with the valve elements and a second position in which the second region is arranged in contact with the valve elements.

5. The active magnetic regenerator device according to claim 4, wherein the cam surface further comprises an intermediate region arranged between the first region and the second region, said intermediate region defining substantially continuous cam sections interconnecting the cam elements of the first region with cam elements of the second region.

6. The active magnetic regenerator device according claim 1, wherein each of the cam elements has a shape which varies substantially continuously along a substantially axial direction.

7. The active magnetic regenerator device according to claim 1, wherein the valve elements are poppet valves.

8. The active magnetic regenerator device according to claim 1, wherein the cam surface forms an inner surface or an outer surface of a ring shaped member.

9. The active magnetic regenerator device according to claim 1, wherein the magnet arrangement further comprises at least two sections of soft magnetic material, arranged between the permanent magnet sections.

10. The active magnetic regenerator device according to claim 1, wherein the regenerator beds are arranged annularly.

11. The active magnetic regenerator device according to claim 10, wherein the regenerator beds are arranged angularly equidistantly.

12. The active magnetic regenerator device according to claim 1, wherein the permanent magnet sections are arranged annularly.

13. The active magnetic regenerator device according to claim 12, wherein the permanent magnet sections are arranged angularly equidistantly.

\* \* \* \* \*